US011685388B2

(12) United States Patent
Flärdh et al.

(10) Patent No.: US 11,685,388 B2
(45) Date of Patent: Jun. 27, 2023

(54) METHOD AND A CONTROL ARRANGEMENT FOR DETERMINING A CONTROL PROFILE FOR A VEHICLE

(71) Applicant: Scania CV AB, Södertälje (SE)

(72) Inventors: Oscar Flärdh, Älvsjö (SE); Fredrik Roos, Segeltorp (SE); Frank Mohr, Värmdö (SE); Erik Holma, Bromma (SE); Björn Johansson, Älvsjö (SE); Henrik Svärd, Saltsjö-Boo (SE)

(73) Assignee: Scania CV AB, Södertälje (SE)

( * ) Notice: Subject to any disclaimer, the term of this patent is extended or adjusted under 35 U.S.C. 154(b) by 170 days.

(21) Appl. No.: 16/607,117

(22) PCT Filed: Mar. 28, 2018

(86) PCT No.: PCT/SE2018/050331
§ 371 (c)(1),
(2) Date: Oct. 22, 2019

(87) PCT Pub. No.: WO2018/203790
PCT Pub. Date: Nov. 8, 2018

(65) Prior Publication Data
US 2020/0298866 A1 Sep. 24, 2020

(30) Foreign Application Priority Data
May 3, 2017 (SE) .................................. 1750532-2

(51) Int. Cl.
B60W 40/10 (2012.01)
B60W 30/14 (2006.01)
B60W 60/00 (2020.01)

(52) U.S. Cl.
CPC ............ *B60W 40/10* (2013.01); *B60W 30/14* (2013.01); *B60W 60/001* (2020.02);
(Continued)

(58) Field of Classification Search
CPC ...... B60W 10/18; B60W 30/16; B60W 10/08; B60W 30/12; B60W 10/11; B60W 30/025; B60K 31/047; B60K 31/00; G05B 13/048
See application file for complete search history.

(56) References Cited

U.S. PATENT DOCUMENTS 5,979,582 A * 11/1999 Hakansson .......... B60K 31/047
180/170
2004/0068359 A1 * 4/2004 Neiss .................... G05B 13/048
180/170
(Continued)

FOREIGN PATENT DOCUMENTS

CN 103998276 A 8/2014
CN 104002680 A 8/2014
(Continued)

OTHER PUBLICATIONS

Novelty Search Report dated Jan. 5, 2017.
(Continued)

Primary Examiner — Yuri Kan
(74) Attorney, Agent, or Firm — Banner & Witcoff, Ltd.

(57) ABSTRACT

A method for determining a reference control profile for a vehicle, including determining (A1) a plurality of control profiles for the vehicle (1) based on topographic information for one and the same future route segment and selecting (A2) one of the plurality of control profiles as a reference control profile, the selection (A2) being based on a tradeoff criterion considering resource consumption and drivability of the plurality of control profiles. The disclosure also relates to a control arrangement (2) for determining a reference control profile for a vehicle (1) and a vehicle comprising the control arrangement (2).

14 Claims, 4 Drawing Sheets

(52) U.S. Cl.
CPC ............... *B60W 2510/0657* (2013.01); *B60W 2510/1005* (2013.01); *B60W 2552/15* (2020.02); *B60W 2554/80* (2020.02)

(56) References Cited

U.S. PATENT DOCUMENTS

| | | | |
|---|---|---|---|
| 2010/0036564 A1 | 2/2010 | Blaise et al. ..................... 701/42 |
| 2014/0121932 A1 | 5/2014 | Zeng ................................ 701/93 |
| 2014/0200788 A1 | 7/2014 | Eriksson et al. ................ 701/93 |
| 2014/0244129 A1* | 8/2014 | Filev ....................... B60K 31/00 |
| | | | 701/93 |
| 2014/0303820 A1* | 10/2014 | Aoki ..................... B60W 10/08 |
| | | | 180/65.265 |
| 2015/0203116 A1* | 7/2015 | Fairgrieve .............. B60W 10/11 |
| | | | 701/93 |
| 2016/0009278 A1 | 1/2016 | Roos et al. |
| 2016/0082947 A1 | 3/2016 | Naumann et al. |
| 2016/0304080 A1* | 10/2016 | Sugiyama ............. B60W 30/16 |
| 2017/0113682 A1* | 4/2017 | Kelly .................. B60W 30/025 |
| 2017/0122754 A1* | 5/2017 | Konishi ............... G05D 1/0274 |

FOREIGN PATENT DOCUMENTS

| | | |
|---|---|---|
| CN | 106064614 A | 11/2016 |
| DE | 10 2011 121 853 A1 | 6/2012 |
| EP | 2 439 428 A1 | 4/2012 |
| EP | 2439428 A1 | 4/2012 |
| EP | 2945140 A1 | 11/2015 |
| SE | 538 817 C2 | 10/2016 |
| SE | 1551396 A1 | 4/2017 |
| WO | WO 03/041988 A1 | 5/2003 |
| WO | WO 2010/144030 A1 | 12/2010 |
| WO | 2011162706 A1 | 12/2011 |
| WO | WO 2011/162706 A1 | 12/2011 |
| WO | WO 2013/095233 A1 | 6/2013 |
| WO | WO 2013/191614 A1 | 12/2013 |

OTHER PUBLICATIONS

Office Action dated Nov. 29, 2017 in corresponding Swedish Patent Application No. 1750532-2.
International Search Report dated May 24, 2018 in corresponding PCT International Application No. PCT/SE2018/050331.
Written Opinion dated May 24, 2018 in corresponding PCT International Application No. PCT/SE2018/050331.
European Search Report, dated Mar. 3, 2021, issued in corresponding European Patent Application No. 18793980.6. Total 8 pages.
Mar. 11, 20221—(CN) First Office Action—App. No. 201880027482.6.

* cited by examiner

METHOD AND A CONTROL ARRANGEMENT FOR DETERMINING A CONTROL PROFILE FOR A VEHICLE

CROSS-REFERENCE TO RELATED APPLICATIONS

The present application is a 35 U.S.C. §§ 371 national phase conversion of PCT/SE2018/050331, filed Mar. 28, 2018, the contents of which are incorporated herein by reference which claims priority of Swedish Patent Application No. 1750532-2, filed May 3, 2017, the contents of which are incorporated by reference herein. The PCT International Application was published in the English language.

TECHNICAL FIELD

The present disclosure relates to technology for vehicles, and in particular to a control arrangement and a method for determining a reference control profile for a vehicle. The disclosure also relates to a vehicle comprising the control arrangement, to a computer program for the method and to a computer-readable medium.

BACKGROUND

A cruise controller is a system that automatically controls the velocity of a vehicle according to a set velocity. The cruise controller controls the velocity of the vehicle by adjusting the torque of the engine or engines of the vehicle. The cruise controller may also control the clutch and the brakes of the vehicle to maintain the set velocity.

It has been established that an experienced truck driver often conducts a truck in a more fuel efficient way than a less experienced truck driver. Also, if the driver has driven the same route before, the driver may be aware of the coming topography and may take advantage of, for example, a coming downhill. In ongoing striving for fuel efficiency, this way of conducting a vehicle has become automated and systems that predict fuel saving velocity profiles for the cruise controller of the vehicle have been developed. The profiles are predicted considering the upcoming topography, and may for example take advantage of a predicted speed increase of the vehicle in a coming downhill. Some of these cruise controllers are known as look-ahead cruise controllers.

A cruise controller holds the velocity of a vehicle generally constant, to a desired set velocity. By letting the velocity fluctuate around the set velocity, the vehicle can produce significant fuel savings. However, certain fuel saving behaviors may be perceived as disturbing to the driver of the vehicle and to surrounding traffic.

From US2016009278A1 it is known to automatically control the velocity of the vehicle to achieve optimizations regarding fuel consumption, drivability and/or comfort in the vehicle, by going beyond preset velocity limits.

SUMMARY

Systems for look-ahead cruise control may use heuristic rules to compute a fuel saving velocity profile. In such case, the possible vehicle behaviors are well defined and may be chosen in such a way that they are acceptable to the driver. Alternatively, the velocity profile may be computed using mathematical optimization. This method may allow for even larger fuel savings than rule-based systems. However, the obtained solution may in certain situations be perceived as counter-intuitive or otherwise not suitable from a drivability perspective.

It is therefore desirable to design cruise control systems that are aimed at letting the speed of the vehicle fluctuate in order to achieve energy savings, in such a manner that the obtained velocity profile is both energy saving and acceptable to the driver. Control profiles for the road ahead may also be determined for control systems of the vehicle other than the cruise controller. These profiles should also be designed such that they are energy saving and acceptable to the driver.

It is thus an object of the disclosure to provide arrangements that can take advantage of large efficiency savings of the vehicle, while still providing a vehicle behavior which is perceived as acceptable to the driver and thereby alleviate at least some of the drawbacks with the prior art.

According to a first aspect, the disclosure relates to a method for determining a reference control profile for a vehicle. The method comprises determining A1 a plurality of control profiles for the vehicle based on topographic information for one and the same future route segment. The method also comprises selecting A2 one of the plurality of control profiles as a reference control profile, the selection A2 being based on a tradeoff criterion considering resource consumption and drivability of the plurality of control profiles.

With the method, it is possible to select the expected best possible control profile for the future route segment based on a plurality of different control profiles. The different control profiles may be determined using different methods, and thus provides a greater selection to choose from, than if only one control profile was determined. The tradeoff criterion is designed such that if large resource consumption savings are possible, larger sacrifices in drivability are allowed. However, if only marginal energy savings are possible, smaller degradations of drivability are allowed.

According to some embodiments, the control profile is related to a powertrain of the vehicle, such as a control profile comprising at least one of a velocity profile, a gear selection profile, an engine torque profile, an engine mode profile or a power distribution profile. Each of the named control profiles belongs to an individual category. Thus, the control profile may comprise a plurality of profiles of which each profile is from an individual category for the same route segment.

According to some embodiments, the method comprises determining at least one control profile of the plurality of control profiles using a rule-based method. In some situations it is advantageous to select control profiles based on a rule-based method, as these in some situations have proven to have a desired behavior.

According to some embodiments, the method comprises determining at least one control profile of the plurality of control profiles using an optimization-based method. The method can thus select a control profile computed by such a method. This may be advantageous, as a control profile calculated using an optimization-based method may result in higher resource consumption savings than a control profile calculated using a rule-based method.

According to some embodiments, the method comprises evaluating resource consumption and drivability for each of the plurality of control profiles, and wherein selecting one of the control profiles as the reference control profile is based on the evaluation. Then resource consumption and drivability may be compared with each other for the plurality of control profiles, and the best candidate can be selected.

According to some embodiments, the tradeoff criterion involves selecting the control profile having the lowest resource consumption among the control profiles having a drivability above a preset drivability level. Thus, a control profile having a low resource consumption but still an acceptable drivability may be selected.

According to some embodiments, the tradeoff criterion involves selecting the control profile having the highest drivability amongst the control profiles having a resource consumption below a certain resource consumption level. Thus, a control profile having a high drivability can be selected, while a relatively high resource consumption is allowed.

According to some embodiments, the method comprises, for each of the plurality of control profiles, determining a resource consumption based on a predicted energy consumption for the vehicle to drive the future route segment according to the respective control profile. Thus, an estimate of the energy consumption can be made, that is comparable with estimates of energy consumption for other control profiles.

According to some embodiments, the method comprises, for each of the plurality of control profiles, determining a resource consumption based on a predicted time duration for the vehicle to drive the future route segment according to the respective control profile. Thus, an estimate of the time duration can be made that is comparable with estimates of time duration for other control profiles.

According to some embodiments, the method comprises, for each of the plurality of control profiles, determining A13 a drivability based on at least one drivability aspect for the vehicle to drive the future route segment according to the respective control profile. Thus, an estimate of the drivability can be made that is comparable with estimates of drivability for other control profiles.

According to some embodiments, the at least one drivability aspect is any one of, or a combination of two or more of: distance to another vehicle; number of gear changes; variance of velocity, time outside a certain velocity interval; variance of driving torque, time outside a certain driving torque interval; variance of braking torque, time outside a certain braking torque interval; number of velocity fluctuations outside a certain velocity interval; number of driving torque variations outside a certain driving torque interval; number of brake torque variations outside a certain brake torque interval; difference between highest and lowest velocity, driving torque or brake torque; derivative of velocity, driving torque or brake torque.

According to some embodiments, the method comprises monitoring A22 the at least one control profile determined with the rule-based method for an indication of at least one predetermined velocity pattern, and upon detecting such an indication, selecting the control profile with the detected predetermined velocity pattern as the reference control profile. Thus, in certain situations it may be desired to use the control profile determined using a rule-based method, and this control profile can be found with this embodiment.

According to some embodiments, the predetermined velocity pattern corresponds to a "schwung" situation where the velocity of the vehicle at the end of a downhill slope goes beyond a preset upper velocity limit. "Schwung" is a term used by the Applicant for allowing a truck to pick up speed on a downhill rather than braking to control speed, which conserves momentum of the truck.

According to some embodiments, the predetermined velocity pattern corresponds to a situation where, because of a power shortfall in an uphill before a crest, the velocity of the vehicle goes below a preset lower velocity limit before a downhill after the crest.

According to some embodiments, the method comprises configuring the tradeoff criterion regarding tradeoff between resource consumption and drivability. Thus, it is then possible to change the tradeoff according to different needs.

According to some embodiments, the method comprises configuring the tradeoff criterion based on security and/or user preference.

According to some embodiments, the method comprises normalizing the resource consumption and/or the drivability. The resource consumption and/or the drivability of the control profiles may thereby be easier to compare with each other.

According to some embodiments, the method comprises maintaining A3, the determined reference control profile, until a next reference control profile is determined.

According to some embodiments, the method comprises using the selected reference control profile for conducting the vehicle during the future route segment. Thus, the reference control profile is used for conducting the vehicle.

According to a second aspect, the disclosure relates to a computer program, comprising instructions which, when the program is executed by a computer, cause the computer to carry out the method described hereinabove and below.

According to a third aspect, the disclosure relates to a computer-readable medium comprising instructions, which, when executed by a computer, cause the computer to carry out the method.

According to a fourth aspect, the disclosure relates to a control arrangement for determining a reference control profile for a vehicle. The control arrangement is configured to determine a plurality of control profiles for the vehicle based on topographic information for one and the same future route segment; and to select one of the plurality of control profiles as a reference control profile, the selection being based on a tradeoff criterion considering resource consumption and drivability of the plurality of control profiles.

According to a fifth aspect, the disclosure relates to a vehicle comprising the control arrangement.

DETAILED DESCRIPTION

The method and control arrangement described in the following enables selecting a control profile for a vehicle, such that resource savings can be made at the same time as the drivability is acceptable when conducting the vehicle with the same control profile. The control profile may for example be a velocity profile for a cruise controller, e.g. a look-ahead cruise controller, of the vehicle.

The method determines, e.g. by calculation or estimation, a plurality of control profiles of the same type for one and the same future route segment, based on rules and/or mathematical optimization. In order to choose the most suitable control profile for the future route segment, a trade-off criterion is applied that defines a trade-off between resource consumption and drivability for the control profiles. Then a trade-off decision is made so that if very large resource savings are possible, larger sacrifices in drivability may be made, whereas if only marginal resource savings are possible, smaller degradations of drivability are allowed.

In the following a vehicle, a control arrangement that can be implemented in the vehicle and a method that may be implemented by the control arrangement will be described.

Figure 1:
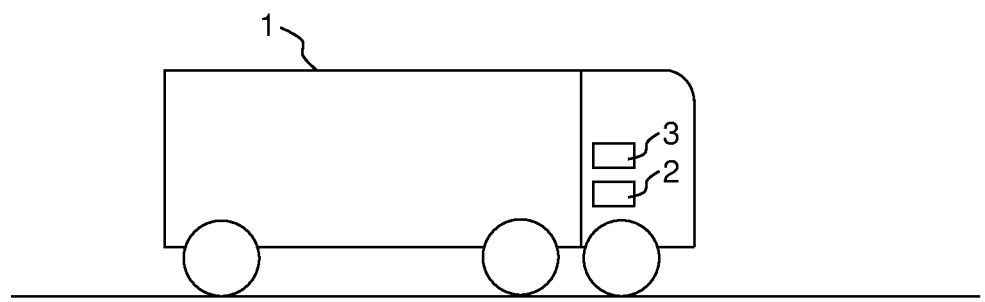
FIG. 1 illustrates a vehicle where the control arrangement according to some embodiments can be arranged.

FIG. 1 illustrates the vehicle 1 comprising the control arrangement 2 and a control system 3. The vehicle 1 is for example a car or a truck, and may be arranged with a trailer. One or several of the functions of the vehicle 1 may be automatically operated. The vehicle 1 itself may be semi-autonomously operated or fully-autonomously operated. The control system 3 may be a powertrain control system, for example one or several of: a cruise control system, a transmission control system, a torque control system, an engine control system and a power distribution control system. The powertrain control system is arranged to control components of the powertrain of the vehicle 1, for example one or several engines, the transmission including gearbox, and brakes, based on a reference control profile. The engine may be a combustion engine or an electrical motor.

According to some embodiments, the vehicle 1 comprises a combustion engine and at least one electrical engine. The one or several engines may be controlled by torque control. Optionally, the one or several engines are controlled by changing the mode of the engine. The mode of the engine may be changed e.g. in order to control the amount of emissions from the vehicle. The vehicle may also be set in a certain powertrain mode. A powertrain mode may be e.g. economy mode, a standard mode or a power mode. The different modes have different requirements, e.g. the economy mode focuses on reduced energy consumption, the power mode gives high power output, and the standard mode has moderate energy consumption and gives moderate power output. The powertrain mode of the vehicle 1 is normally set by the driver or hauler. As understood, the powertrain mode of the vehicle 1 might influence the tradeoff between resource consumption and drivability. The vehicle 1 also comprises a braking system that is designed to create a brake torque which acts to reduce the velocity of the vehicle 1, e.g. by reducing the speed of rotation of the wheel set propelling the vehicle 1. The braking system can comprise one or more of auxiliary brakes, such as engine brake, exhaust brake, electromagnetic retarder and hydraulic retarder.

Energy consumption of the vehicle 1 from energy sources that are stored in the vehicle 1, this coming from fuel (fuel consumption), electrical energy (electrical energy consumption) or chemical energy from fuel cells (chemical energy consumption).

More in detail, the cruise control system is arranged to control the velocity of the vehicle 1 based on input parameters such as a set velocity and a velocity interval around the set velocity, where the speed of the vehicle 1 is allowed to fluctuate, and a reference velocity profile. The cruise control system may be a look-ahead cruise control system. The transmission control system is arranged to control the gearbox of the vehicle 1 using a reference gear selection profile. The engine control system is arranged to control the one or several engines using a reference torque profile. The engine control system may also be arranged to control the one or several engines using a reference engine mode profile. For example, the engine control system may also be arranged to control the one or several engines using an emission control profile, such that the emission control can be optimized. The engine control system may also be arranged to control the braking system using a reference brake torque profile. Further, the power distribution control system is arranged to split, e.g. combine, the power from several sources, e.g. a combustion engine and one or several electrical engines, to achieve greatest efficiency. For example, a planetary gear set may be used in the power distribution control system. The power distribution control system is arranged to control the power distribution based on a reference power distribution profile. Some or all of the mentioned control systems may be implemented in one control unit e.g. a transmission control unit. However, the control systems may alternatively be implemented in a plurality of control units.

Figure 2:
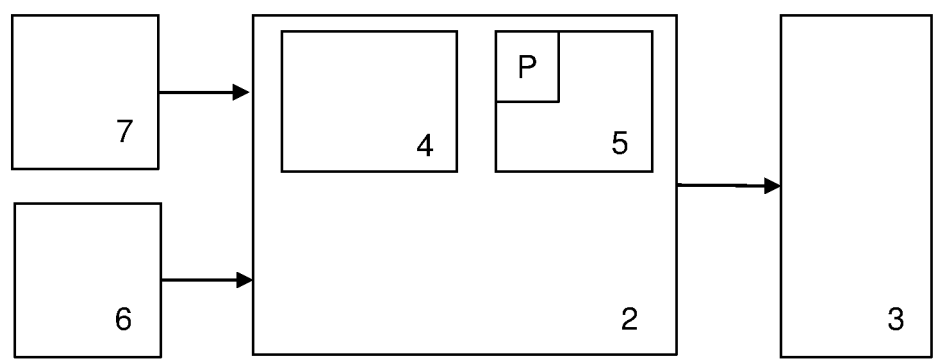
FIG. 2 illustrates a control arrangement according to some embodiments.

FIG. 2 illustrates the control arrangement 2 in further detail. The control arrangement 2 comprises a processor 4 and a memory 5. The processor 4 comprises e.g. one or several Central Processing Units (CPU). The memory 5 comprises e.g. one or several memory units. A memory unit may comprise a volatile and/or a non-volatile memory, such as a flash memory or Random Access Memory (RAM). The control arrangement 2 further comprises a computer program P comprising instructions which, when the program is executed by a computer, cause the computer to carry out the method that will be described in the following. The program may be downloaded from a computer-readable medium, e.g. a memory stick or memory from another computer. Thus, the computer-readable medium comprises instructions, which, when executed by a computer, cause the computer to carry out the method that will be described in the following. Optionally, the control arrangement 2 comprises one or several control units, for example electronic control units (ECUs).

The control arrangement 2 is arranged to determine a reference control profile for the vehicle 1. Thus, a reference control profile for use by any one of the above described control systems 3 of the vehicle 1. The control system 3 is further arranged to be controlled according to the determined reference control profile. In order to determine a reference control profile, the control arrangement 2 is configured to determine a plurality of control profiles for the vehicle 1 based on topographic information for one and the same future route segment. In other words, the control arrangement 2 is configured to determine a plurality of possible candidate control profiles for the vehicle 1, based on the topographic information for the one and the same future route segment. In order to be able to do this, the control arrangement 2 is arranged to obtain information from other sources to be able to determine the position of the vehicle 1 and characteristics of the coming road where the vehicle 1 will drive. For example, the control arrangement 2 is arranged to obtain the position of the vehicle 1 from a positioning unit 5 of the vehicle 1. The positioning unit 5 may use the Global Positioning System, GPS, to determine the position of the vehicle 1. The positioning unit 5 may alternatively determine the position of the vehicle 1 by means of wireless communication, vehicle to vehicle communication, vehicle to infrastructure communication, radar sensing or similar. By knowing the absolute position of other sources, the position of the vehicle 1 may be determined by triangulation. The characteristics of the coming road, e.g. map information such as topographic information of the road and road curvature, may be determined by a map unit 6. The driver typically sets the start and goal of the current driving mission. In order to drive from the start to the goal, an appropriate route along one or several roads is selected on a map, by the driver, or automatically. The map unit 6 may then continually provide relevant topographic information, road curvature etc. for the future route segment to the control arrangement 2. The topographic information is e.g. provided based on the position of the vehicle 1 along the selected route. Optionally, the functionality of the map unit 6 is included in the control arrangement 2. The future route segment is typically between 1-3 kilometers, e.g. 2 kilometers, of the upcoming road of the vehicle 1 along the route. Thus, the future route segment is a road segment in front of the vehicle 1. The route segment starts from the vehicle 1 and extends the mentioned distance ahead along the selected route along one or several roads.

The internal units of the vehicle 1, such as control arrangements, control units, devices, sensors, detectors etc., are arranged to communicate via a communication bus, for example a CAN-bus (Controller Area Network), which uses a message based protocol. Alternatively, other communication protocols may be used e.g. TTP (Time-Triggered Protocol), Flexray, etc. In this way signals and data described herein may be exchanged between different units, devices, sensors and/or detectors in the vehicle 1. Sometimes signals and data are transferred wirelessly between the different units, devices, sensors and/or detectors.

The control arrangement 2 is further configured to select one of the plurality of control profiles as a reference control profile. The selection is based on a tradeoff criterion considering resource consumption and drivability of the plurality of control profiles. This will be more explained in the following with reference to a corresponding method.

Figure 3:
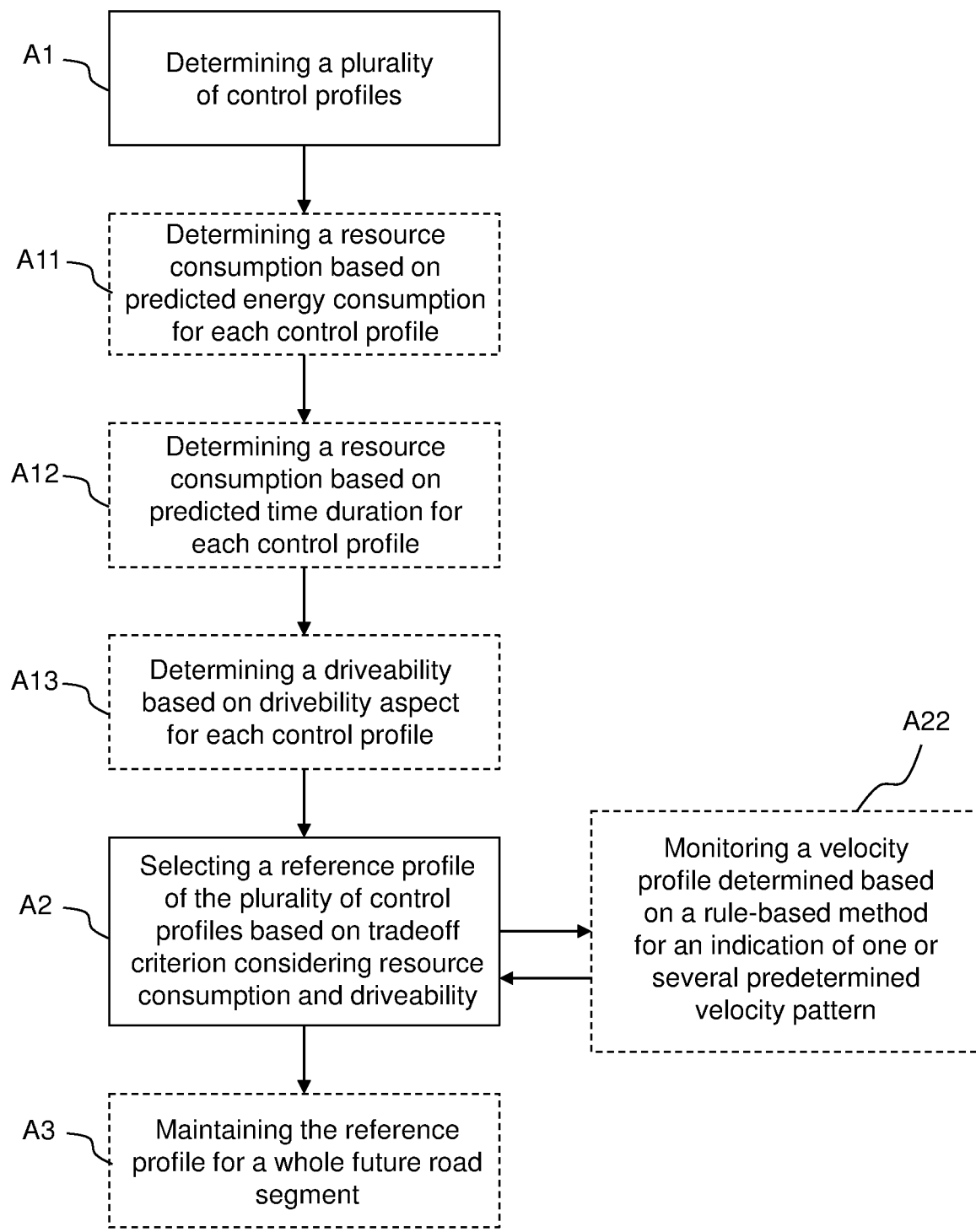
FIG. 3 illustrates a flow chart of the method for determining a control profile according to some embodiments.

Hence, the disclosure also relates to a method for determining the reference control profile for the vehicle 1. The method will now be described with reference to the flowchart in FIG. 3. The method can be implemented by for example the above described control arrangement 2. It will be appreciated that the various embodiments described for the method are all combinable with the control arrangement 2 as defined in accordance with the second aspect. That is, the control arrangement 2 may be configured to perform any one of the embodiments of the method described herein.

The method comprises determining A1 a plurality of control profiles for the vehicle 1 based on topographic information for one and the same future route segment. The plurality of control profiles is of the same type. For example, each control profile may comprise a velocity profile. However, a control profile may comprise several profiles from different categories. For example, one control profile may comprise a velocity profile, a gear selection profile and an engine torque profile, determined for the same route segment. A category is for example velocity, gear, engine torque, engine mode or power distribution.

The control profile is related to the powertrain of the vehicle 1. For example, the control profile comprises at least one of a velocity profile, a gear selection profile, an engine torque profile, an engine mode profile or a power distribution profile. A control profile typically comprises a plurality of set values and/or commands for the intended control system 3, distributed in position along the length of the route segment in the profile. A velocity profile thus comprises a plurality of velocity values. A gear selection profile comprises a plurality of gear settings. An engine torque profile comprises a plurality of torque commands. A power distribution profile comprises a plurality of power distribution commands. As understood, a control profile may comprise several different related profiles as they may be intimately related, for example a velocity profile and a gear selection profile for the one and same route segment.

According to some embodiments, the method comprises determining A1 at least one control profile of the plurality of control profiles using a rule-based method. The rule-based method is based on one or several heuristic rules. A heuristic rule is for example determined based on experiments or a rule of thumb. The heuristic rule may comprise a constraint on the vehicle 1, for example that the torque of the engine(s) should be within a certain interval, and/or that the velocity of the vehicle 1 should be within a certain interval. Other examples of heuristic rules are: to open the powertrain (includes neutral gear, open clutch etc. depending of the configuration of the powertrain), or to drag the engine (includes zero injected fuel, but the powertrain is closed). The rule-based method may then comprise to simulate a model of the vehicle 1 with the constraint(s) while driving the future predicted route segment, and determine the control profile, here a torque profile and/or a velocity profile, for the route segment. From experiments, it is known that certain driving behavior is very energy efficient, and thus constraints can be set such that such driving behavior is obtained in the simulation. Desired control values and/or commands can then be retrieved for the future route segment.

According to some embodiments, the method comprises determining A1 at least one control profile of the plurality of control profiles using an optimization-based method. The optimization-based method is based on a mathematical optimization. In the mathematical optimization, an optimization problem is solved wherein a plurality of alternative control profiles are calculated considering one or several constraints, and the best alternative is chosen. Typically, a cost function is established and minimized, and the most optimal control profile is chosen, i.e. the control profile with the lowest cost.

According to some embodiments, the plurality of control profiles comprise only control profiles determined using the rule-based method. Alternatively, the plurality of control profiles comprise only control profiles determined using the optimization-based method. According to a further alternative, the plurality of control profiles comprises at least one profile determined using the rule-based method, and at least one profile determined using the optimization-based method. According to a still further alternative, the plurality of control profiles comprises a plurality of profiles determined using the rule-based method, and a plurality of profiles determined using the optimization-based method. According to a still further alternative, the plurality of control profiles comprises one profile determined using the rule-based method, and a plurality of profiles determined using the optimization-based method. According to a still further alternative, the plurality of control profiles comprises a plurality of profiles determined using the rule-based method, and one profile determined using the optimization-based method.

Upon the plurality of control profiles comprises at least two control profiles determined using the rule-based method, each of the at least two control profiles is determined based on a different rule. For example, if three control profiles, i.e. control profile A, control profile B and control profile C, are determined using the rule-based method, then control profile A is determine using a rule A, the control profile B is determined using a rule B and control profile C is determined using a rule C, where rule A, rule B and rule C are different from each other.

Upon the plurality of control profiles comprising at least two control profiles determined using the optimization-based method, each of the at least two profiles are determined based on a different optimization. For example, if three control profiles, i.e. control profile D, control profile E and control profile F, are determined using the optimization-based method, then control profile D is determined using an optimization D, the control profile E is determined using an optimization E and control profile F is determined using an optimization F, where optimization D, optimization E and optimization F are different from each other. For example, the constraints of the different optimizations may be set differently.

The method further comprises selecting A2 one of the plurality of control profiles as a reference control profile. The selection A2 is based on a tradeoff criterion considering resource consumption and drivability of the plurality of control profiles. The method further comprises using the selected reference control profile for conducting the vehicle 1 during the future route segment. The method typically comprises maintaining A3 the determined reference control profile until a next reference control profile is determined. However, a criterion may be implemented including a minimum time for changing to another reference control profile, such that the reference control profile is not changed too often.

The method is especially advantageous when both of at least one control profiles determined using an optimization-based method and at least one control profile determined using a rule-based method are included in the set of plurality of control profiles. One or more of the control profiles may be so called "fall back" solutions, solutions which may not lead to optimal energy consumption, but are known to be acceptable from a drivability point of view. The method may take advantage of large energy savings made possible by mathematical optimization, while still providing a behavior which is perceived as acceptable to the driver. The method makes it possible to use rules and mathematical optimization algorithms to compute a resource saving profile, although they sometimes lead to degradation in drivability. The method may for example guarantee that large degradations in drivability occur only when it leads to significant resource savings, e.g. energy savings.

Resource consumption is related to energy consumption and/or time consumption. Drivability is defined as the degree of smoothness and steadiness of acceleration of the vehicle 1. In other words, the drivability is the degree of the vehicle 1 being drivable, of being easy or pleasant to drive.

According to some embodiments, the method comprises evaluating resource consumption and drivability for each of the plurality of control profiles, and wherein the selecting A2 of one of the control profiles as the reference control profile is based on the evaluation. As a basis for the evaluation, the method may comprise determining representative respective values for resource consumption and drivability for each of the plurality of control profiles.

Thus, according to some embodiments, the method comprises, for each of the plurality of control profiles, determining A11 a resource consumption based on a predicted energy consumption for the vehicle 1 to drive the future route segment according to the respective control profile. The determination of the predicted energy consumption may be based on a model of the energy consumption of the vehicle 1. With "to drive the future route segment" is here meant a simulated drive of the future route segment.

The resource consumption may also be determined based on a combination of the energy consumption and a predicted created kinetic energy for the vehicle 1 at the end of the future route segment according to the respective control profile. The predicted created kinetic energy for the vehicle 1 here refers to the predicted kinetic energy at an end state of the vehicle 1. Considering an example where the vehicle 1 is predicted to have a first end velocity at the end of a first control profile, and is predicted to have a second end velocity at the end of a second control profile, and the second end velocity is higher than the first end velocity, then the second control profile gives rise to a larger kinetic energy than the first control profile. A control profile may be compensated for the contribution of the created kinetic energy of the vehicle 1. The kinetic energy for the respective control profile may be transformed into a corresponding saved energy consumption and withdrawn from the predicted energy consumption for driving the same future route segment. The contribution of the kinetic energy to the energy consumption may be weighted by a scaling factor. The created kinetic energy may also be weighted in relation to the topography. For example, if the future route segment ends in the beginning of a downhill, the kinetic energy may be weighted with a lower scaling factor, than the scaling factor used if the future end segment would end in an uphill. This is because it is desired to have a high velocity in an uphill, but in the beginning of a downhill it is desired to have a low velocity.

According to some embodiments, for each of the plurality of control profiles, the method comprises determining A12 a resource consumption based on a predicted time duration for the vehicle 1 to drive the future route segment according to the respective control profile. As has been previously described, the vehicle 1 is normally set to be conducted in relation to a set velocity that may be set by the driver to the cruise controller. A set time duration for the vehicle 1 to drive the future route segment according to the set velocity can then be predicted. The resource consumption may then be determined A12 based on how much the predicted time duration deviates from the set time duration. The resource consumption may thus be a predicted time deviation from the set time duration. The time duration may also be represented in other ways, e.g. by an integration of the time duration etc. To sum up, it is desired to select among those profiles that over time for the future route segment, gives a mean velocity corresponding to the set velocity, or gives a mean velocity with a small deviation from the set velocity.

According to some embodiments, the method comprises, for each of the plurality of control profiles, determining A13 a drivability based on at least one drivability aspect for the vehicle 1 to drive the future route segment according to the respective control profile. The at least one drivability aspect is any one of, or a combination of two or more of: distance to another vehicle; number of gear changes; variance of the velocity, time outside a certain velocity interval; variance of the driving torque, time outside a certain driving torque interval; variance of the braking torque, time outside a certain braking torque interval; number of velocity fluctuations outside a certain velocity interval; number of driving torque variations outside a certain driving torque interval; number of brake torque variations outside a certain brake torque interval; difference between highest and lowest velocity, difference between highest and lowest driving torque; difference between highest and lowest brake torque; derivative of velocity; derivative of driving torque or derivative of brake torque. Each drivability aspect may be reduced to, or represented by, a value, and the drivability may be calculated as one drivability aspect value or a sum of several drivability aspect values. One or several drivability aspects may be weighted such that each drivability aspect gives the desired effect on the total sum of the drivability. For example, the distance to another vehicle may be monitored by one or several sensors of the vehicle 1. A smaller distance than a preset distance typically renders a lower drivability as the maneuver space for the driver and vehicle is reduced. The number of gear changes is monitored by a counter, and a number of gear changes above a preset number of gear changes is considered to render low drivability, etc. Each profile is then analyzed to evaluate two criteria; energy consumption and drivability. The results of this analysis are then used to make a final trade-off decision, deciding which of the computed velocity profiles to use.

Figure 4A:
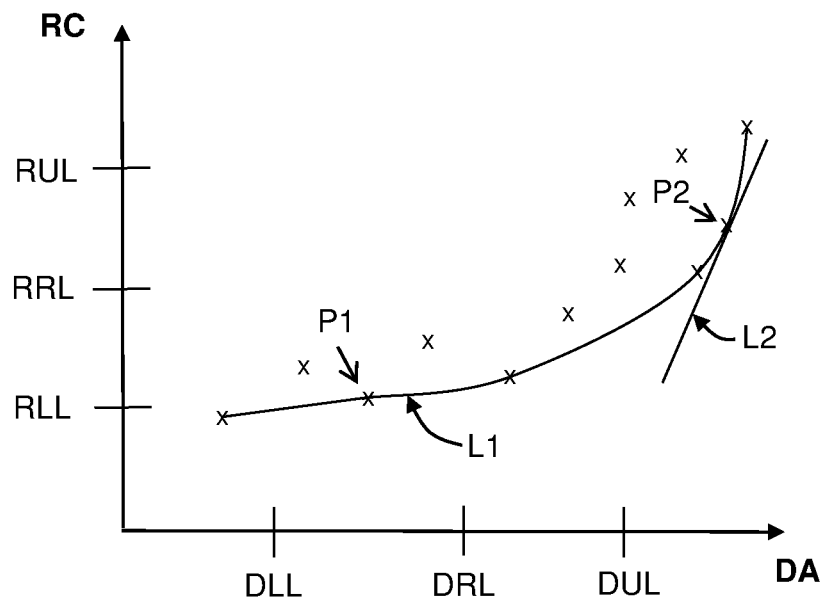
FIG. 4A illustrates a diagram with two axes with a plurality of control profiles represented.

FIG. 4A is a diagram with drivability (DA) on the X-axis and resource consumption (RC) on the Y-axis. Each cross in the diagram represents one control profile of the plurality of control profiles. As can be seen from the diagram, the control profiles with a low resource consumption normally have a low drivability. The control profiles with a high drivability normally have a high resource consumption. Consequently, for selecting a reference control profile of the plurality of control profiles, a tradeoff has to be made between resource consumption and drivability. The resource consumption is here based on energy consumption or time consumption. The method may comprise normalizing the resource consumption and/or the drivability to more easily compare the different control profiles.

The method may comprise configuring the tradeoff criterion regarding tradeoff between resource consumption and drivability. The tradeoff criterion may be configured to allow more, or less, resource consumption and drivability. For example, the tradeoff criterion may include threshold levels, where the threshold levels set the limit for the resource consumption and the drivability. The method may comprise configuring the tradeoff criterion based on security and/or user preference. For example, the driver may configure the tradeoff criterion such that the drivability is high as it will generally make the driver feels more comfortable. According to another example, the method comprises configuring the tradeoff criterion based on the location of the vehicle 1. For example, if the vehicle 1 is in a city the drivability should be high, whereas if the vehicle 1 is driving on the countryside the resource consumption should be low and the drivability can be more neglected.

In the diagram 4A, a plurality of candidate control profiles are depicted with a respective "x" according to their drivability and resource consumption. The drivability on the X-axis is depicted with three threshold levels, a low level (DLL), a regular level (DRL) and an upper level (DUL). Below DLL indicates a low drivability, the DRL indicates a regular drivability and above DUL indicates a high drivability. DUL represents a higher drivability than DRL, and DRL represents a higher drivability than DLL. DRL indicates the middle of an interval between DLL and DUL. The resource consumption on the Y-axis is depicted with three threshold levels, a low level (RLL), a regular level (RRL) and an upper level (RUL). Below RLL indicates a low resource consumption, the RRL indicates a regular resource consumption and above RUL indicates a high resource consumption. RUL represents a higher resource consumption than RRL, and RRL represents a higher resource consumption than RLL. RRL indicates the middle of an interval between RLL and RHL. The tradeoff criterion may be configured to include any of the threshold levels or intervals. The indicated threshold levels are thus only indicated as examples, and may be other threshold levels.

According to an example embodiment, it is desirable to have a low resource consumption, e.g. energy consumption, but still a certain drivability. The tradeoff criterion then involves selecting A2 the control profile having the lowest resource consumption amongst the control profiles having a drivability above a preset drivability level. Referring to the diagram 4A, the preset drivability level is here set to DLL, and the indicated control profile P1 is selected as reference profile, as P1 has the lowest resource consumption amongst the control profiles having a drivability above DLL.

According to another example embodiment, it is desirable to have a high drivability and it is allowed to have a high resource consumption in order to achieve it. The tradeoff criterion then involves selecting A2 the control profile having the highest drivability amongst the control profiles having a resource consumption below a certain resource level. Referring to the diagram 4A, the certain resource level is here set to RUL, and the indicated control profile P2 is selected as reference profile, as P2 has the highest drivability amongst the control profiles having a resource consumption below RUL.

According to some embodiments, the method comprises selecting a reference control profile within the interval limited by DLL and DUL, and within the interval RLL and RUL. The control profile having the highest drivability with the lowest resource consumption within the interval is selected.

In FIG. 4A a curve L1 is illustrated that interconnects a set of control profiles that are considered to be "Pareto efficient" or "Pareto optimal". The set of control profiles may be referred to as the "Pareto set" of control profiles. The control profiles in the Pareto set, here including both P1 and P2, are the control profiles that are Pareto efficient. A control profile is a Pareto efficient if there is no alternative control profile (of all the candidate control profiles in the diagram), where an improvement can be made to at least one of resource consumption and drivability, without reducing any of the resource consumption and drivability for the control profile. According to some embodiment, the reference control profile should thus preferably be selected from the set of Pareto efficient control profiles. In some aspects, the inclination of the curve L1 describes how much it costs (in terms of resource consumption respective drivability) to change from one Pareto efficient control profile to another Pareto efficient control profile. If the inclination is large in terms of resource consumption, then the resource consumption cost is high for changing to another Pareto efficient control profile. If the inclination in terms of drivability is high, then the drivability cost is high for changing to another Pareto efficient control profile.

By weighting the resource consumption against the drivability, appropriate threshold levels for selecting a reference control profile may be determined. This may be done by establishing a function RC=C−2DA, where RC is the resource consumption, C is the maximum allowed resource consumption during the future route segment and DA is the drivability. The drivability DA is here weighted with a factor 2 against the resource consumption. The resulting curve L2 is illustrated in the diagram in FIG. 4A. Where the curve L2 intersects the curve L1 is determined to be a threshold (or limit), and a reference control profile is thus determined in relation to the threshold. As understood, a plurality of thresholds may be determined based on this method.

Figure 4B:
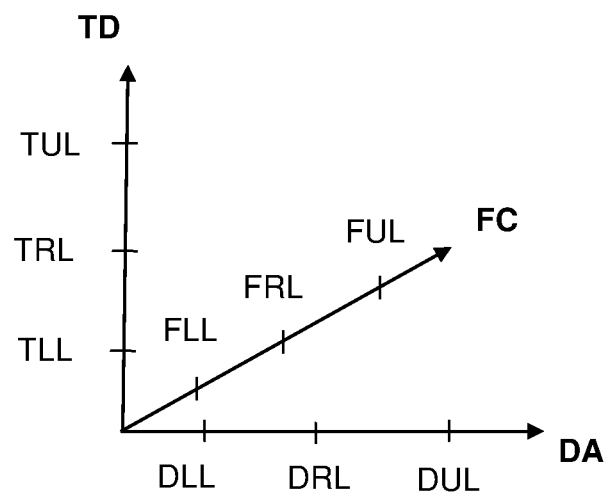
FIG. 4B illustrates a diagram with three axes where a plurality of control profiles could be represented.

FIG. 4B is illustrating another diagram with drivability (DA) on the X-axis, energy consumption (FC) on the Y-axis, and time duration, or time deviation from a set time duration, (TD) on the Z-axis. The crosses representing one control profile of the plurality of control profiles are here omitted, but it should be understood that each control profile of the plurality of control profiles is represented in the diagram with a drivability, an energy consumption and a time duration.

The drivability has the same drivability threshold levels along the X-axis as illustrated in FIG. 4A. The energy consumption on the Y-axis is depicted with three threshold levels, a low level (FLL), a regular level (FRL) and an upper level (FUL). Below FLL indicates a low energy consumption, the FRL indicates a regular energy consumption and above FUL indicates a high energy consumption. FUL is higher than FRL, and FRL is higher than FLL. FRL indicates the middle of an interval between FLL and FHL. The time duration on the Y-axis is depicted with three threshold levels, a low level (TLL), a regular level (TRL) and an upper level (TUL). Below TLL indicates a small time-duration, the TRL indicates a regular time duration and above TUL indicates a large time duration. TUL is higher than TRL, and TRL is higher than TLL. TRL indicates the middle of an interval between TLL and THL. The Y-axis may instead represent a time deviation (TD) from a set time duration. The time deviation on the Y-axis is then depicted with three threshold levels, a low level (TLL), a regular level (TRL) and an upper level (TUL). Below TLL then indicates a small time-deviation, the TRL indicates a regular time deviation and above TUL indicates a large time deviation. The tradeoff criterion may be configured to include any of the threshold levels, or intervals. The indicated threshold levels are thus only indicated as examples, and may be other threshold levels.

Another exemplary embodiment is based on it being desirable to have a low energy consumption and a small time-duration, but still a certain drivability. The tradeoff criterion then involves selecting A2 the control profile having the lowest energy consumption and the smallest time duration among the control profiles having a drivability above a preset drivability level. Referring to the diagram 4B, the preset drivability level is here set to DLL, and a control profile is selected that has the lowest energy consumption and smallest time duration amongst the control profiles having a drivability above DLL.

Another exemplary embodiment is based on it being desirable to have a high drivability and that it is allowable to have a high energy consumption in order to achieve it, but it is still desired to drive to the goal in a certain time that is a maximum allowed time duration. The tradeoff criterion then involves selecting A2 the control profile having the highest drivability amongst the control profiles having an energy consumption below a certain energy consumption level, but a time duration below a certain time duration level. Referring to the diagram 4B, the certain energy consumption level is here set to FUL, and the certain time duration level is set to TUL. The control profile having the highest drivability amongst the control profiles having a resource consumption below RUL and a time duration below TUL is selected.

According to some embodiments, the method comprises selecting a reference control profile within the interval limited by DLL and DUL, within the interval FLL and FUL and within the interval TLL and TUL. The control profile having the highest drivability with the lowest resource consumption within the interval is selected.

It should be understood that it is also here possible to define a set of control profiles that are considered to be "Pareto efficient" or "Pareto optimal" and to determine thresholds as has been described with reference to FIG. 4A.

In a situation when at least one control profile has been determined based on the rule-based method and at least one control profile amongst the plurality of control profiles has been determined using an optimization based method, it is often desired to drive according to the control profile determined using the optimization-based method. The reason is that the optimization-based method may come across solutions that, for example, are not obvious for the human. However, there are some situations where it is known that the control profile determined using a rule-based method gives a more desired behavior. The method may comprise monitoring for these situations, and upon detecting such a situation, selecting the control profile with the detected situation as the reference control profile. In other words, according to some embodiments, the method comprises monitoring A22, the at least one control profile determined with the rule-based method, for an indication of at least one predetermined velocity pattern, and upon detecting such an indication, selecting the control profile with the detected predetermined velocity pattern as the reference control profile. The indication may for example be a signal indicating a high level, or data with a message indicating that this control profile has a certain pattern. The indication then comes with or is comprised in the control profile.

Figure 5:
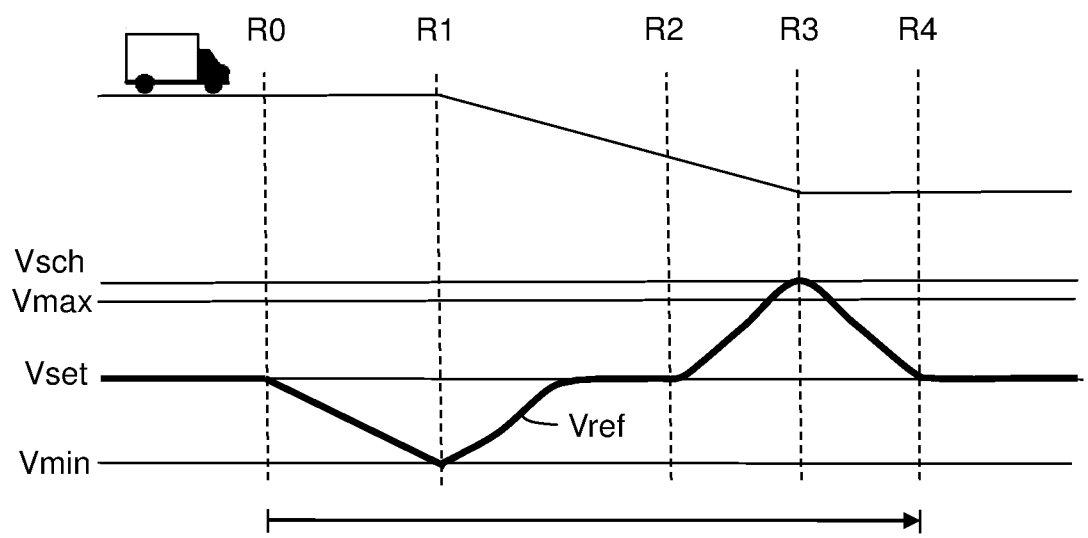
FIG. 5 illustrates a diagram with a velocity profile of the vehicle.

FIG. 5 illustrates a simulated velocity profile for the vehicle 1, here denoted Vref. The velocity profile is determined using a rule-based method. The uppermost line with the vehicle is illustrating the topography, and the lowermost arrow is illustrating the length of the route segment the vehicle 1 will soon travel along. The velocity is set to follow a certain set velocity Vset. The velocity of the vehicle 1 is allowed to fluctuate around Vset within an interval limited by Vmin and Vmax. The denotations R1, R2 ... R5 indicates where the velocity profile of the vehicle 1 is changing.

In some situations, the velocity may be allowed to increase to more than Vmax, and thus to an even higher level Vsch. This is allowed if the velocity of the vehicle 1 after a downhill because of gravity, the inclination of the downhill and the weight of the vehicle is simulated to increase to more than Vmax. The velocity of the vehicle 1 will then not be lowered, instead the velocity of the vehicle 1 is allowed to increase up to Vsch. This may be referred to as a "schwung". After the downhill the vehicle 1 can take advantage of the gained energy and roll out down to Vset, or use the gained energy in thereafter coming uphill. In other words, according to some embodiments, the predetermined velocity pattern corresponds to a schwung situation (term is described above) where the velocity of the vehicle 1 after a downhill goes beyond a preset upper velocity limit. The upper velocity limit here Vmax. Thus, a schwung situation can be detected by detecting an end of a downhill slope and the velocity of the vehicle 1 at the end of this downhill is allowed to increase above the preset upper velocity limit. In WO2013191614A1 is described in more detail how such a velocity profile may be determined.

In an exemplary embodiment, the velocity of the vehicle 1 is allowed to decrease more that Vmin if it is caused to power shortfall. This situation is allowed if it is known that the vehicle 1 will soon regain its velocity in a following downhill. In other words, according to some embodiments, the predetermined velocity pattern corresponds to a situation where the velocity of the vehicle 1, because of a power shortfall in an uphill before a crest, goes below a preset lower velocity limit before a downhill after the crest. For example, where the velocity of the vehicle has decreased below Vmin due to a power shortfall, it is allowed to control the vehicle to a velocity below Vmin using power reduction. This is allowed only if the following two conditions are fulfilled: In a direct following downhill, the vehicle accelerates and the vehicle will continue to accelerate to Vmax even without energy contribution, e.g. fuel injection. Power reduction is accomplished by setting a lower torque, typically zero or negative torque corresponding to zero energy, to the engine of the vehicle 1. Normally, when the velocity of the vehicle 1 goes below Vmin, then maximum torque is set to the engine. But, if a steep downhill follows, the vehicle 1 is maintained at below Vmin even if it had been possible to control the vehicle 1 to a velocity above Vmin. Thus, the velocity of the vehicle 1 is allowed to stay below the lower velocity limit by reducing torque before the downhill.

The present invention is not limited to the above-described preferred embodiments. Various alternatives, modifications and equivalents may be used. Therefore, the above embodiments should not be taken as limiting the scope of the invention, which is defined by the appended claims.

The invention claimed is:

1. A method for operating a motor vehicle, the motor vehicle having a plurality of control systems, the method comprising, with a control arrangement that includes at least one processor, and at least one memory:
   determining a reference control profile for a control system from the plurality of control systems by:
      determining a plurality of control profiles for operating the control system of the motor vehicle based on topographic information for one and a same future route segment,
      and
      selecting one of the determined plurality of control profiles as the reference control profile, the selection being based on a tradeoff criterion considering at least resource consumption and drivability of each of the determined plurality of control profiles, wherein the tradeoff criterion includes selecting the control profile with a combination of a lowest resource consumption among the determined plurality of control profiles and the drivability above a preset drivability level; and
   controlling the control system with the reference control profile while the motor vehicle travels along the one and the same future route segment.

2. The method according to claim 1, wherein each control profile of the plurality of control profiles is related to a powertrain of the motor vehicle, and wherein each control profile of the plurality of control profiles comprises at least one profile selected from a velocity profile, a gear selection profile, an engine torque profile, an engine mode profile, and a power distribution profile.

3. The method according to claim 1, comprising determining at least one control profile of the plurality of control profiles using a rule-based method.

4. The method according to claim 1, comprising determining at least one control profile of the plurality of control profiles using an optimization-based method.

5. The method according to claim 1, comprising evaluating resource consumption and drivability for each of the plurality of control profiles, and wherein the selecting the one of the determined plurality of control profiles as the reference control profile is based on the evaluation.

6. The method according to claim 1, comprising, for each of the plurality of control profiles, determining a resource consumption based on a predicted energy consumption for the motor vehicle to drive the one and the same future route segment according to the respective control profile.

7. The method according to claim 1, comprising, for each of the plurality of control profiles, determining a resource consumption based on a predicted time duration for the motor vehicle to drive the one and the same future route segment according to the respective control profile.

8. The method according to claim 1, comprising, for each of the plurality of control profiles, determining, a drivability based on at least one drivability aspect for the motor vehicle to drive the one and the same future route segment according to the respective control profile.

9. The method according to claim 8, wherein the at least one drivability aspect is any one of, or a combination of two or more of: distance to another vehicle; number of gear changes; variance of velocity, time outside a certain velocity interval; variance of driving torque, time outside a certain driving torque interval; variance of braking torque, time outside a certain braking torque interval; number of velocity fluctuations outside a certain velocity interval; number of driving torque variations outside a certain driving torque interval; number of brake torque variations outside a certain brake torque interval; difference between: highest and lowest velocity, driving torque or brake torque; and derivative of velocity, driving torque or brake torque.

10. The method according to claim 1, comprising configuring the preset drivability level based on security and/or user preference.

11. A non-transitory computer-readable medium comprising a computer program on the medium wherein instructions from the computer program, which, when executed by a computer, cause the computer to carry out the method according to claim 1.

12. A non-transitory computer-readable medium comprising a computer program on the medium, wherein instructions from the computer program, which, when executed by a computer, cause the computer to carry out the method according to claim 4.

13. The method according to claim 7, comprising, for each of the plurality of control profiles, determining a time deviation between the predicted time duration and a set time duration.

14. The method according to claim 13, wherein the tradeoff criterion includes selecting the control profile based on the time deviation and a time deviation threshold level.

* * * * *